(12) United States Patent
Gurvich et al.

(10) Patent No.: US 11,242,822 B2
(45) Date of Patent: *Feb. 8, 2022

(54) STRUCTURED PANEL WITH MULTI-PANEL STRUCTURE(S)

(71) Applicant: Rohr, Inc., Chula Vista, CA (US)

(72) Inventors: Mark R. Gurvich, Middletown, CT (US); Georgios S. Zafiris, Glastonbury, CT (US); Jeffrey A. Anderson, San Diego, CA (US); Jose S. Alonso-Miralles, Chula Vista, CA (US); Milan Mitrovic, Del Mar, CA (US); Terry Muy, Chula Vista, CA (US); George Hoehn, Oceanside, CA (US); Timothy Olson, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 16/220,513

(22) Filed: Dec. 14, 2018

(65) Prior Publication Data

US 2020/0191091 A1 Jun. 18, 2020

(51) Int. Cl.
*F02K 1/82* (2006.01)
*F02C 7/24* (2006.01)

(52) U.S. Cl.
CPC ............... *F02K 1/827* (2013.01); *F02C 7/24* (2013.01); *F05D 2260/96* (2013.01)

(58) Field of Classification Search
CPC ......... F02K 1/827; F02C 7/24; F05D 2260/96
USPC ....................................................... 181/292
See application file for complete search history.

(56) References Cited

U.S. PATENT DOCUMENTS

| | | | |
|---|---|---|---|
| 2,333,343 | A | 11/1943 | Sendzimir |
| 3,011,602 | A | 12/1961 | Ensrud et al. |
| 3,341,395 | A | 9/1967 | Weber |
| 3,380,206 | A | 4/1968 | Barnett |
| 3,439,774 | A | 4/1969 | Callaway |
| 3,507,355 | A | 4/1970 | Lawson |
| 3,542,152 | A | 11/1970 | Adamson et al. |
| 3,639,106 | A | 2/1972 | Yate |

(Continued)

FOREIGN PATENT DOCUMENTS

| | | |
|---|---|---|
| CN | 101649818 | 7/2011 |
| CN | 104723616 | 6/2015 |

(Continued)

OTHER PUBLICATIONS

EP search report for EP19166905.0 dated Sep. 16, 2019.
EP search report for EP19216015.8 dated May 26, 2020.
EP search report for EP19216189.1 dated May 26, 2020.

*Primary Examiner* — Forrest M Phillips
(74) *Attorney, Agent, or Firm* — Getz Balich LLC

(57) ABSTRACT

A structured panel is provided that includes a first skin with a plurality of perforations, a second skin and a core. The core forms a plurality of cavities vertically between the first skin and the second skin. Each of the cavities is respectively fluidly coupled with one or more of the perforations. The cavities include a first cavity. An element of the core is configured with a multi-layered structure. The multi-layered structure includes a first layer and a second layer attached to the first layer. The first layer is configured with a first rib projecting into the first cavity.

20 Claims, 16 Drawing Sheets

(56) References Cited

U.S. PATENT DOCUMENTS

| | | | |
|---|---|---|---|
| 3,640,357 A | 2/1972 | Kitching et al. |
| 3,734,234 A | 5/1973 | Wirt |
| 3,819,007 A | 6/1974 | Wirt et al. |
| 3,821,999 A | 7/1974 | Guess et al. |
| 3,831,710 A | 8/1974 | Wirt |
| 3,848,697 A | 11/1974 | Jannot et al. |
| 3,850,261 A | 11/1974 | Hehmann et al. |
| 3,910,374 A | 10/1975 | Holehouse |
| 3,948,346 A | 4/1976 | Schindler |
| 3,969,563 A | 7/1976 | Hollis, Sr. |
| 4,189,027 A | 2/1980 | Dean, III et al. |
| 4,240,519 A | 12/1980 | Wynosky |
| 4,859,517 A | 8/1989 | Hull |
| 5,431,980 A | 7/1995 | McCarthy |
| 5,498,462 A | 3/1996 | Darfler |
| 5,634,306 A | 6/1997 | Riegelman |
| 5,923,003 A | 7/1999 | Arcas et al. |
| 5,997,985 A | 12/1999 | Clarke et al. |
| 6,598,701 B1 | 7/2003 | Wood et al. |
| 6,725,541 B1 | 4/2004 | Holme et al. |
| 6,871,725 B2 | 3/2005 | Johnson |
| 6,949,282 B2 | 9/2005 | Obeshaw |
| 7,124,856 B2 | 10/2006 | Kempton et al. |
| 7,784,283 B2 | 8/2010 | Yu et al. |
| 7,814,658 B2 | 10/2010 | Akishev et al. |
| 7,878,229 B2 | 2/2011 | Nakajima et al. |
| 7,959,109 B2 | 6/2011 | Dasilva et al. |
| 7,963,362 B2 | 6/2011 | Lidoine |
| 7,971,684 B2 | 7/2011 | Ganite et al. |
| 8,025,122 B2 | 9/2011 | Gilcreest et al. |
| 8,245,815 B2 | 8/2012 | Valleroy et al. |
| 8,336,316 B2 | 12/2012 | Kirby |
| 8,413,922 B2 | 4/2013 | Porte et al. |
| 8,449,707 B2 | 5/2013 | Simmons et al. |
| 8,517,309 B2 | 8/2013 | Robinson |
| 8,544,598 B2 | 10/2013 | Gaudry et al. |
| 8,646,574 B2 | 2/2014 | Drevon et al. |
| 8,684,301 B2 | 4/2014 | Porte et al. |
| 8,733,501 B2 | 5/2014 | Porte et al. |
| 8,763,751 B2 | 7/2014 | Starobinski et al. |
| 8,776,946 B2 | 7/2014 | Todorovic |
| 8,820,477 B1 | 9/2014 | Herrera et al. |
| 8,955,643 B2 | 2/2015 | Liu |
| 9,592,918 B2* | 3/2017 | Yu .......................... B64D 33/06 |
| 9,704,467 B1 | 7/2017 | Nampy |
| 10,414,481 B2* | 9/2019 | Pierick .................... F02K 1/827 |
| 10,695,986 B2* | 6/2020 | Gurney ................ G10K 11/172 |
| 2007/0272483 A1* | 11/2007 | Morin .................... F02K 1/827 |
| | | 181/292 |
| 2011/0100747 A1 | 5/2011 | Hoetzeldt et al. |
| 2013/0266772 A1 | 10/2013 | Fujii |
| 2014/0034416 A1 | 2/2014 | Liu |
| 2014/0349082 A1 | 11/2014 | Tien |
| 2015/0110603 A1 | 4/2015 | Biset et al. |
| 2015/0284945 A1 | 10/2015 | Tien |
| 2015/0367953 A1 | 12/2015 | Yu et al. |
| 2016/0312709 A1 | 10/2016 | Nampy |
| 2017/0225764 A1 | 8/2017 | Nampy |
| 2017/0229106 A1 | 8/2017 | Nampy |
| 2017/0301334 A1 | 10/2017 | Nampy |
| 2018/0010798 A1* | 1/2018 | Pettersson ............... F02K 1/827 |
| 2018/0142621 A1* | 5/2018 | Biset ...................... F02K 1/827 |
| 2018/0229829 A1 | 8/2018 | Pierick |

FOREIGN PATENT DOCUMENTS

| | | |
|---|---|---|
| FR | 2201010 | 4/1974 |
| GB | 1406844 | 9/1975 |
| RU | 2413654 | 6/2010 |

* cited by examiner

STRUCTURED PANEL WITH MULTI-PANEL STRUCTURE(S)

BACKGROUND

1. Technical Field

This disclosure relates generally to structured panels and, more particularly for example, to a structured panel that attenuates sound generated by a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. Reducing the thickness of the acoustic panel also has the concern of compromising structural integrity.

There is a need in the art for acoustic and structural panels with increased structural integrity and reduced thicknesses.

SUMMARY OF THE DISCLOSURE

According to an aspect of the present disclosure, a structured panel is provided that includes a first skin, a second skin and a core. The first skin is configured with or otherwise includes with a plurality of perforations. The core forms a plurality of cavities vertically between the first skin and the second skin. Each of the cavities is respectively fluidly coupled with one or more of the perforations. The cavities include a first cavity. An element of the core is configured with a multi-layered structure. The multi-layered structure includes a first layer and a second layer attached to the first layer. The first layer is configured with a first rib projecting into the first cavity.

According to another aspect of the present disclosure, another structured panel is provided that includes a first skin, a second skin and a core. The first skin is configured with or otherwise includes with a plurality of perforations. The core forms a plurality of cavities vertically between the first skin and the second skin. The core includes an array of corrugations that include a first baffle, a second baffle and a first septum. The cavities include a first cavity fluidly coupled with one or more of the perforations. The first cavity is formed longitudinally between the first baffle and the second baffle. The first septum extends from the first baffle to the second baffle. The first septum divides the first cavity into fluidly coupled sub-cavities. The array of corrugations is configured with a multi-layered structure. The multi-layered structure includes a first layer and a second layer bonded to the first layer. The first layer is configured with a first structural reinforcement projecting into the first cavity.

According to still another aspect of the present disclosure, a method is provided for manufacturing a structured panel for attenuating sound. During this method, a first skin for the panel, a second skin for the panel and a core for the panel are provided. The core is bonded to the first skin and the second skin. The core forms a plurality of cavities between the first skin and the second skin. Each of the cavities is respectively fluidly coupled with one or more perforations in the first skin. The cavities include a first cavity. An element of the core is configured with a multi-layered structure. The multi-layered structure includes a first layer and a second layer attached to the first layer. The first layer is configured with a first structural reinforcement projecting into the first cavity.

The first structural reinforcement may be configured as or otherwise include a rib.

The core may include an array of corrugations that include a first baffle, a second baffle and a first septum. The first cavity may be formed longitudinally between the first baffle and the second baffle. The first septum may extend from the first skin and the first baffle to the second skin and the second baffle. The first septum may divide the first cavity into fluidly coupled sub-cavities.

The element may be configured as or otherwise include the first baffle.

The element may be configured as or otherwise include the first septum.

The element may be configured as or otherwise include the array of corrugations.

The core may further include a first wall and a second wall. The first cavity may be formed laterally between the first wall and the second wall. The element may be configured as or otherwise include the first wall.

The second layer may be configured with a second rib. The first rib and the second rib may be disposed on opposing sides of the multi-layered structure.

The core may include an array of corrugations that include a first baffle, a second baffle and a first septum. The first cavity may be formed longitudinally between the first baffle and the second baffle. The first septum may extend from the first skin and the first baffle to the second skin and the second baffle. The first septum may divide the first cavity into fluidly coupled sub-cavities. The first rib may project into a first of the fluidly coupled sub-cavities. The second rib may project into a second of the fluidly coupled sub-cavities.

The cavities may further include a second cavity adjacent the first cavity. The second rib may project into the second cavity.

The first rib may extend along a first trajectory. The second rib may extend along a second trajectory that is non-parallel with the first trajectory.

The first rib may extend along a first trajectory. The second rib may extend along a second trajectory that is parallel with the first trajectory.

The first rib may at least partially (or completely) overlap the second rib.

The first rib may be configured as a solid first rib. Alternatively, the first rib may be configured as a hollow rib.

The first layer may be further configured with a second rib projecting into the first cavity.

The core may be configured from or otherwise include composite material. The first layer and the second layer each may be configured from or otherwise include a discrete ply of fiber reinforcement.

The panel may be configured as a panel of a nacelle for an aircraft propulsion system.

The foregoing features and the operation of the invention will become more apparent in light of the following description and the accompanying drawings.

DETAILED DESCRIPTION

The present disclosure includes structured panels such as, but not limited to, acoustic panels for attenuating sound; e.g., noise. Each structured panel may include one or more multi-layered structures with one or more structural reinforcements, such as rib structures, for increasing rigidity, strength, stability (i.e., resistance to buckling) and/or other metrics of structural integrity of that panel. For ease of description, the following disclosure will first describe a general panel configuration without structural reinforcements and then describe how one or more multi-layered structures and associated structural reinforcement(s) may be added to one or more elements (e.g., components) of the panel to increase rigidity, strength, stability and/or other metrics of structural integrity of that panel.

Figure 1:
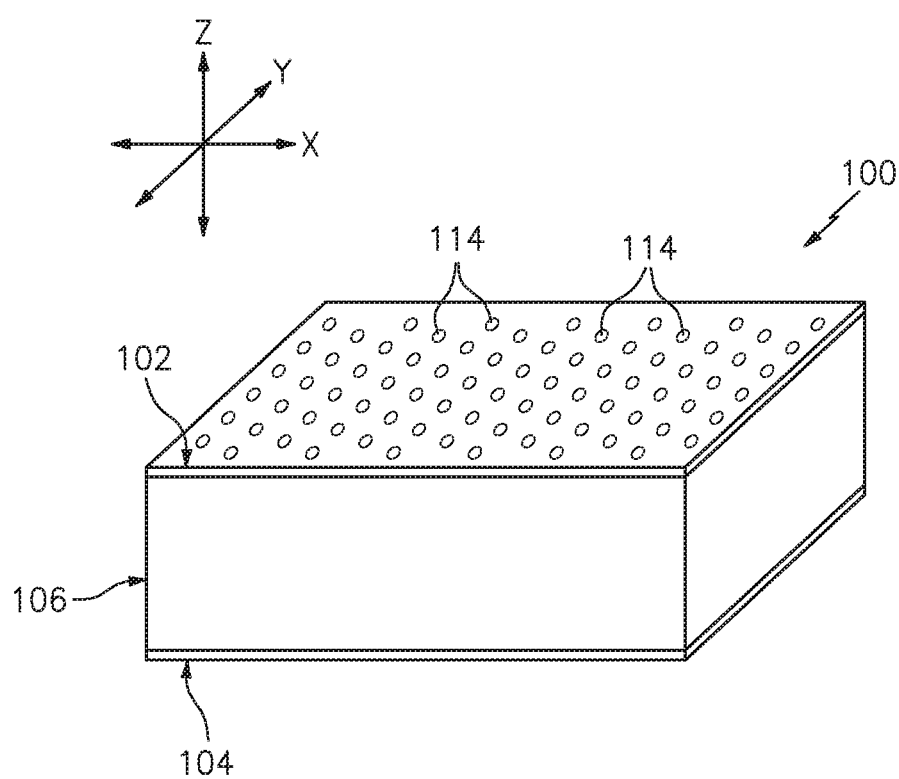
FIG. 1 is a partial, perspective schematic illustration of an acoustic panel, in accordance with various embodiments.

FIG. 1 is a partial, perspective schematic illustration of an acoustic panel 100 for attenuating noise. This acoustic panel 100 may be configured to attenuate noise generated by an aircraft propulsion system such as, for example, a turbofan propulsion system or a turbojet propulsion system. With such a configuration, the acoustic panel 100 may be configured with a nacelle of the propulsion system. The acoustic panel 100, for example, may be configured as or with an inner or outer barrel, a translating sleeve of a thrust reverser, a blocker door, etc. Alternatively, the acoustic panel 100 may be configured with another component/structure of the aircraft such as its fuselage or a wing. Furthermore, the acoustic panel 100 may be configured to also or alternatively attenuate aircraft related noise other than that generated by the propulsion system. The acoustic panel 100 of the present disclosure, however, may alternatively be configured for non-aircraft applications.

The acoustic panel 100 extends longitudinally along an x-axis. The acoustic panel 100 extends laterally along a y-axis. The acoustic panel 100 extends vertically along a z-axis. The term "vertical" is used herein to describe a depthwise panel direction and is not limited to a gravitational up/down direction. Furthermore, for ease of illustration, the x-y plane is shown as a generally flat plane.

However, in other embodiments, the x-y plane and, thus, the acoustic panel 100 may be curved and/or follow an undulating geometry. For example, the x-y plane and, thus, the acoustic panel 100 may be arcuate, cylindrical or conical with or without radial undulations. Thus, the vertical direction may change at different locations along the x-y plane; e.g., the vertical direction may be a radial direction for a cylindrical or conical acoustic panel.

The acoustic panel 100 includes a perforated first (e.g., face) skin 102, a solid non-perforated second (e.g., back) skin 104 and a cellular core 106. Briefly, the cellular core 106 is disposed and extends vertically between the first skin 102 and the second skin 104. The cellular core 106 is also connected to the first skin 102 and the second skin 104. The cellular core 106, for example, may be fused, adhered, welded, brazed and/or otherwise bonded to the first skin 102 and/or the second skin 104. The cellular core 106 may also or alternatively be mechanically fastened to the first skin 102 and/or the second skin 104. Alternatively, the cellular core 106 may be formed integral with the first skin 102 and/or the second skin 104 as a monolithic body using, for example, additive manufacturing. However, the present disclosure is not limited to any particular manufacturing methods.

Figure 2:
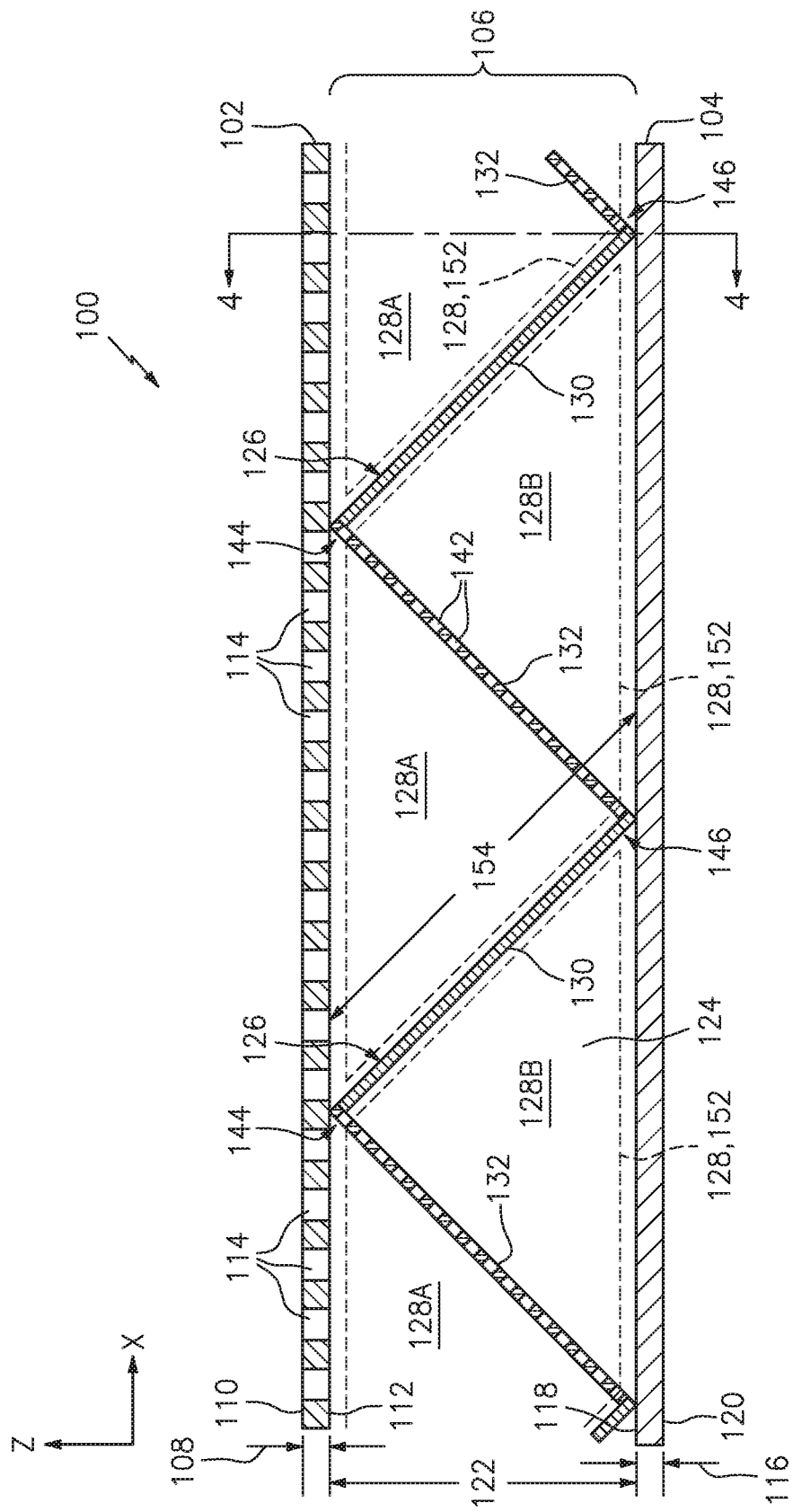
FIG. 2 is a first side sectional illustration of a portion of the acoustic panel, in accordance with various embodiments.

The first skin 102 may be configured as a relatively thin sheet or layer of material that extends longitudinally and laterally along the x-y plane. This first skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. Referring now to FIG. 2, the first skin 102 has a vertical thickness 108 that extends vertically between opposing side surfaces 110 and 112. The first skin 102 includes a plurality of perforations 114; e.g., apertures such as through-holes (see also FIG. 1). Each of these perforations 114 extends generally vertically through the first skin 102 between its side surfaces 110 and 112. In other embodiments, the perforations 114 may be non-uniform through the thickness 108 and/or may be non-perpendicular to the side surfaces 110 and/or 112.

The second skin 104 may be configured as a relatively thin sheet or layer of (e.g., continuous and uninterrupted) material that extends longitudinally and laterally along the x-y plane (see FIG. 1). This second skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. The second skin material may be the same as or different than the first skin material. The second skin 104 has a vertical thickness 116 that extends vertically between opposing side surfaces 118 and 120. This vertical thickness 116 may be substantially equal to or different (e.g., greater or less) than the vertical thickness 108 of the first skin 102. The thickness 108 of the first skin 102 and/or the thickness 116 the second skin 104 may be uniform or non-uniform along the x-y plane.

Figure 3:
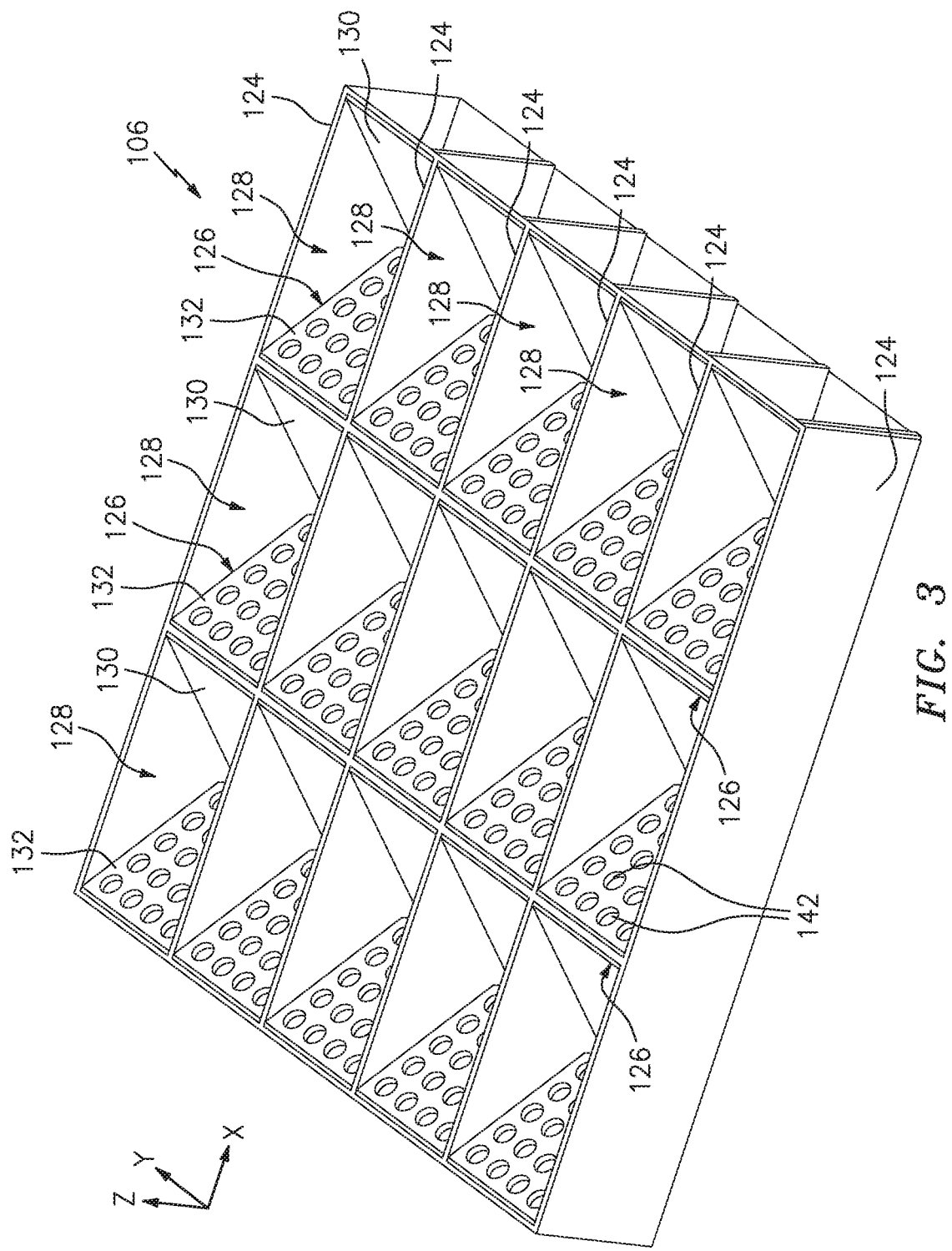
FIG. 3 is a perspective illustration of a cellular core of the acoustic panel portion, in accordance with various embodiments.

Referring to FIG. 3, the cellular core 106 extends longitudinally and laterally along the x-y plane. Referring again to FIG. 2, the cellular core 106 has a vertical thickness 122 that extends vertically between opposing core sides, which sides are respectively abutted against the first skin 102 and the second skin 104 and their side surfaces 112 and 118. The vertical thickness 122 may be substantially greater than the vertical thicknesses 108 and 116 of the first skin 102 and/or the second skin 104, respectively. The vertical thickness 122, for example, may be at least ten to forty times (10-40×), or more, greater than the vertical thicknesses 108 and 116; however, the acoustic panel 100 of the present disclosure is not limited to such an exemplary embodiment.

Figure 4:
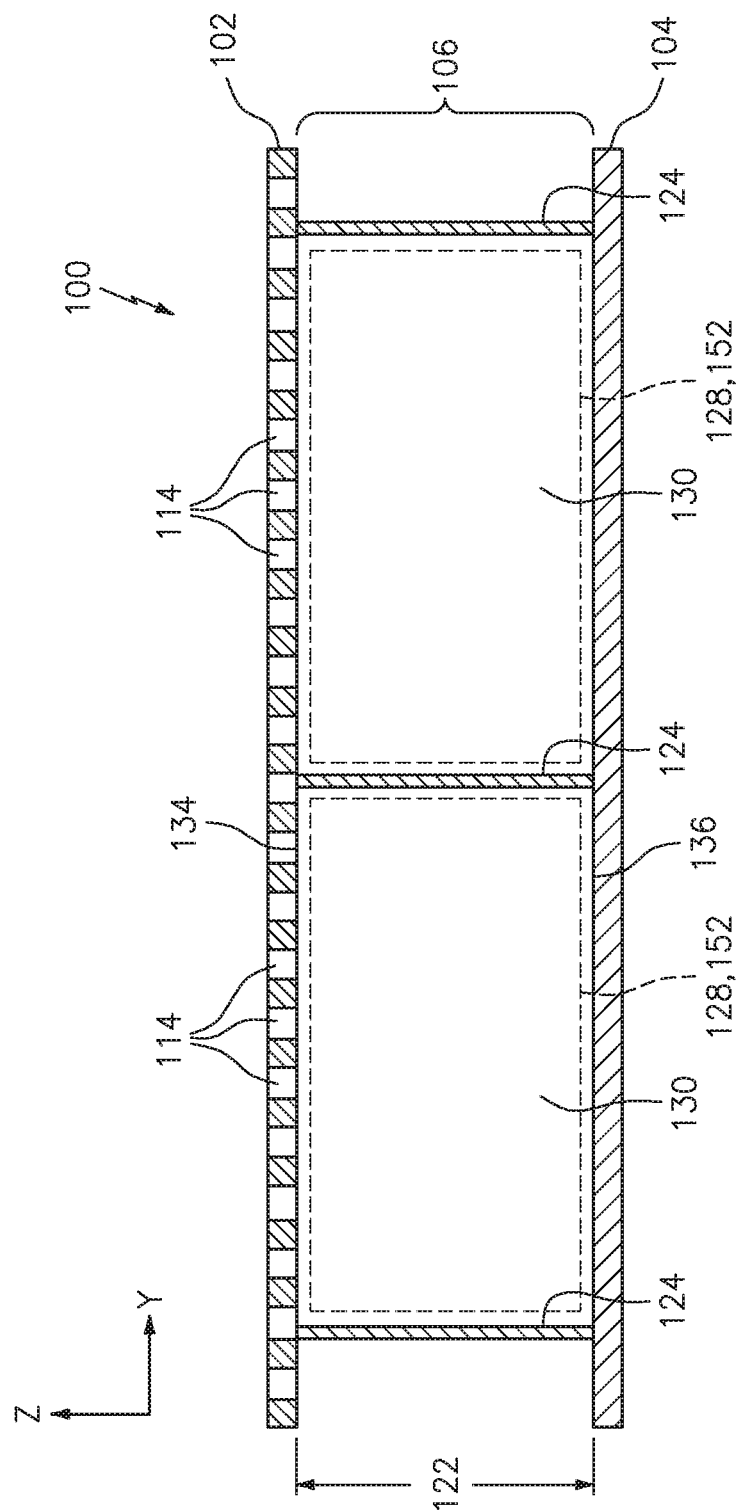
FIG. 4 is a second side sectional illustration of the acoustic panel portion, in accordance with various embodiments.

Referring to FIGS. 2-4, the cellular core 106 includes a plurality of solid non-perforated walls 124 (e.g., cavity sidewalls) and one or more arrays of corrugations 126. The walls 124 and corrugations 126 are arranged together to configure the cellular core 106 as an open cavity (e.g., open cell) structure. This open cavity structure forms a plurality of cavities 128 (each including divided sub-cavities 128A and 128B) vertically between the first skin 102 and the second skin 104. Each of these cavities 128 may be fluidly coupled with one or more respective perforations 114 in the first skin 102 (see FIG. 2).

Referring to FIG. 3, each of the walls 124 has a length that extends longitudinally along the x-axis. Each of the walls 124 has a thickness that extends laterally along the y-axis. Referring now to FIG. 4, each of the walls 124 has a height 122 that extends vertically between the first skin 102 and the second skin 104.

Each of the walls 124 is at least partially (or completely) connected to or otherwise engaged with the first skin 102 and/or the second skin 104. Each of the exemplary walls 124 of FIG. 4 is orientated substantially perpendicular to the first skin 102 and the second skin 104; e.g., at a ninety-degree angle to the skins 102 and 104. However, in other embodiments, one or more of the walls 124 may be angularly offset from the first skin 102 and/or the second skin 104 by a non-ninety-degree angle; e.g., an acute angle or an obtuse angle.

The walls 124 are arranged generally parallel with one another; see also FIG. 3. The walls 124 are laterally spaced from one another along the y-axis so as to respectively form the cavities 128 between the walls 124. Each of the walls 124 shown in FIG. 4 therefore respectively forms lateral sides of adjacent cavities 128 on either side of the respective wall 124. Each of the walls 124 thereby also fluidly separates those cavities 128 on either side of the wall 124.

Referring to FIG. 3, the corrugations 126 in each array are disposed and extend laterally between a laterally adjacent pair of the walls 124; see also FIG. 4. Each of the corrugations 126 includes a solid non-perforated baffle 130 and a porous (e.g., perforated) septum 132. In another exemplary embodiment, one or more or each of the corrugations 126 includes only porous (e.g. perforated) septa 132, or only solid non-perforated baffles 130 in an alternating periodic or non-periodic pattern along the y-axis or the x-axis or both.

Figure 5:
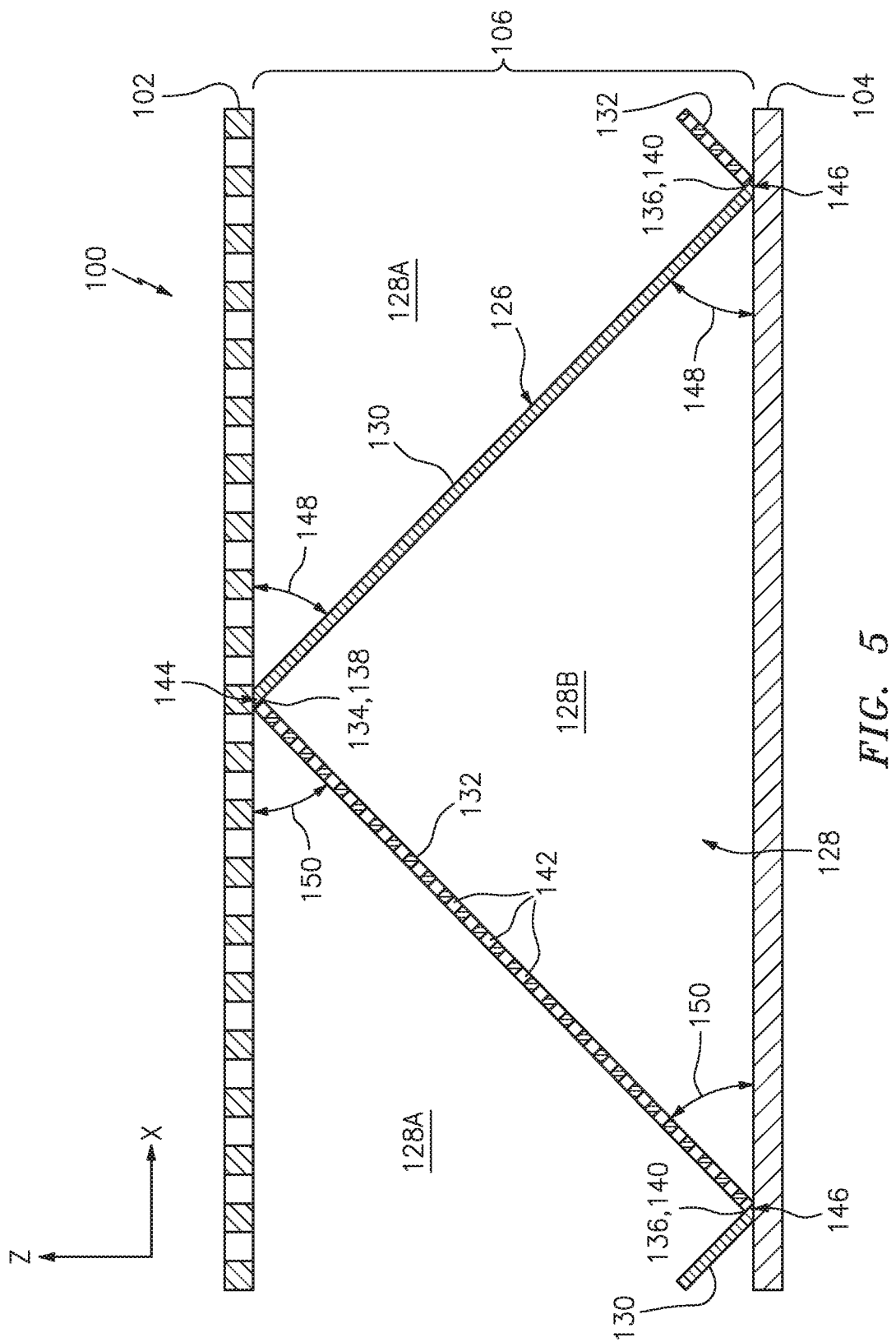
FIG. 5 is a partial enlarged view of the acoustic panel portion of FIG. 2, in accordance with various embodiments.

Referring to FIGS. 4 and 5, the baffle 130 has a width extending laterally between opposing lateral sides. These lateral sides are at least partially (or completely) connected to or otherwise engaged with a respective laterally adjacent pair of the walls 124. Referring to FIG. 5, the baffle 130 has a length extending diagonally (e.g., vertically and longitudinally) between opposing top and bottom ends 134 and 136. Note, the terms "top" and "bottom" are used above to describe ends of the baffle 130 as situated in the drawings and are not intended to limit the baffle 130 or the acoustic panel 100 to such an exemplary gravitational orientation.

The septum 132 has a width extending laterally between opposing lateral sides. These lateral sides are connected to or otherwise engaged with a respective laterally adjacent pair of the walls 124. The septum 132 has a length extending diagonally (e.g., vertically and longitudinally) between opposing top and bottom ends 138 and 140. Note, the terms "top" and "bottom" are used above to describe ends of the septum 132 as situated in the drawings and are not intended to limit the septum 132 or the acoustic panel 100 to such an exemplary gravitational orientation.

The septum 132 includes one or more perforations 142. In the exemplary embodiment of FIG. 5, the perforations 142 are configured as through holes. However, in other embodiments, the perforations 142 may be formed by interconnected pores in the septum 132 where the septum material, for example, has an open cell porous structure.

The top end 134 of the baffle 130 is connected at least partially (or completely) to or otherwise engaged with the first skin 102. This top end 134 is also longitudinally connected to the top end 138 of the septum 132 at an interface 144 between the baffle 130 and the septum 132. The bottom end 136 of the baffle 130 is connected to or otherwise engaged with the second skin 104. This bottom end 136 is also longitudinally connected to the bottom end 140 of a septum 132 of an adjacent one of the corrugations 126 at an interface 146. With the foregoing configuration, the baffle 130 extends vertically between the first skin 102 and the second skin 104 and longitudinally between the septums 132. The baffle 130 is therefore angularly offset from the first skin 102 and the second skin 104 by an included angle 148; e.g., between 30-60 degrees. This angle 148 is an acute angle such as, but not limited to, about forty-five degrees (45°).

Figure 6:
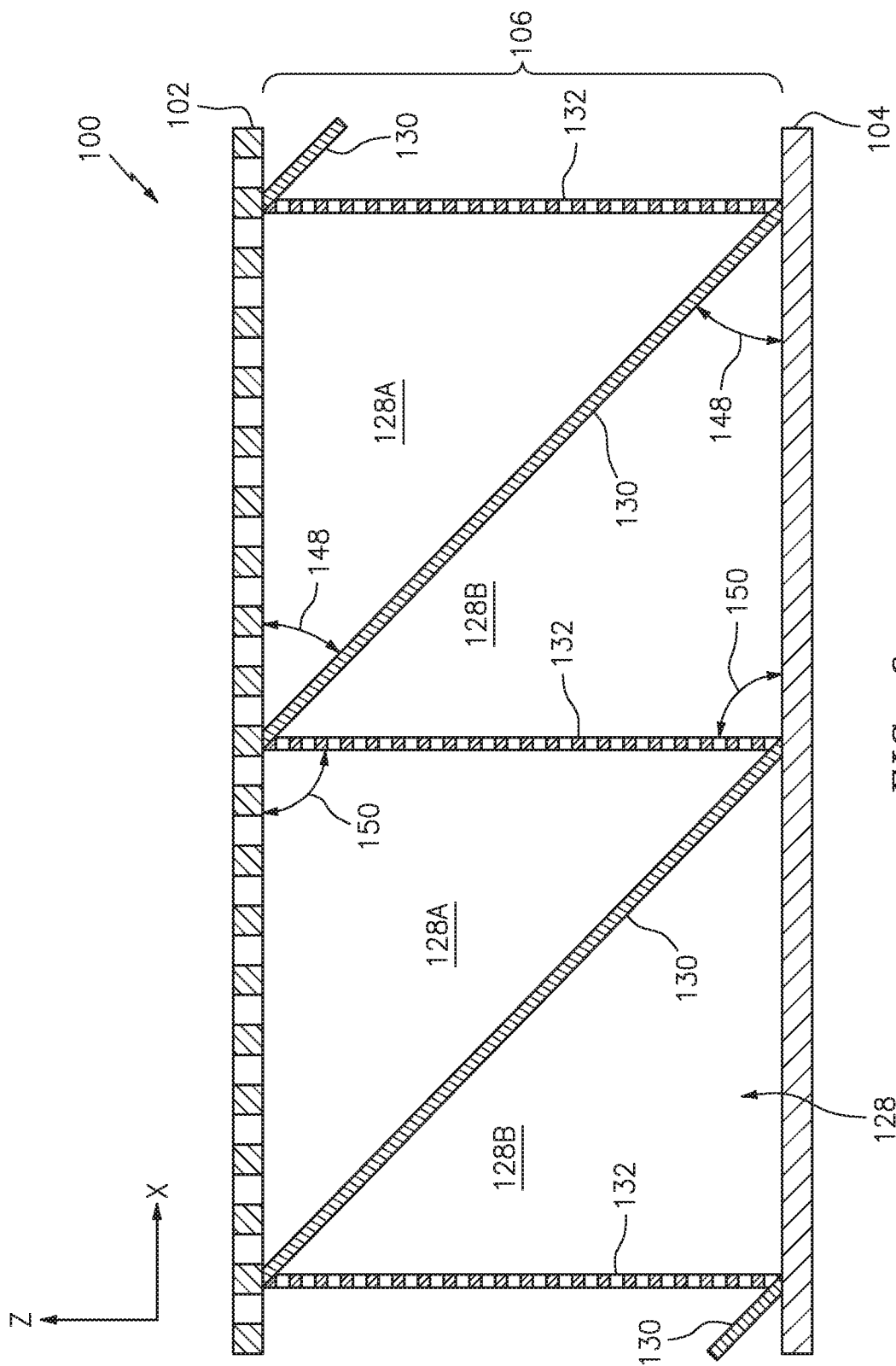
FIG. 6 is a first side sectional illustration of a portion of another acoustic panel, in accordance with various embodiments.

The top end 138 of the septum 132 is at least partially (or completely) connected to or otherwise engaged with the first skin 102. This top end 138 is also longitudinally connected to the top end 134 of the baffle 130 as described above. The bottom end 140 of the septum 132 is at least partially (or completely) connected to or otherwise engaged with the second skin 104. This bottom end 140 is also longitudinally connected to the bottom end 136 of a baffle 130 of an adjacent one of the corrugations 126 at an interface; e.g., the interface 146. With the foregoing configuration, the septum 132 extends vertically between the first skin 102 and the second skin 104 and longitudinally between the baffles 130. The septum 132 is therefore angularly offset from the first skin 102 and the second skin 104 by an included angle 150; e.g., between 30-60 degrees. This angle 150 may be an acute angle such as, but not limited to, about forty-five degrees (45°). The angle 150 may be substantially equal to the angle 148 as shown in FIG. 5. Alternatively, the angle 150 may be different from the angle 148; e.g., a larger or smaller acute angle, or a right angle. For example, the angle 150 may be about ninety degrees and the angle 148 may be about forty-five degrees as shown in FIG. 6. In another example the angle 148 may be about ninety degrees and the angle 150 may be about forty-five degrees Referring to FIG. 2, each of the cavities 128 extends longitudinally between and is formed by a longitudinally adjacent pair of the baffles 130. Each septum 132 is disposed within and divides a respective one of the cavities 128 into fluidly coupled sub-cavities 128A and 128B. More particularly, the perforations 142 in the septum 132 fluidly couple the sub-cavities 128A and 128B together.

Each of the cavities 128 forms a resonance chamber 152. A length 154 of the resonance chamber 152 extends diagonally (e.g., longitudinally and vertically) between the first skin 102 and the second skin 104 and through a respective one of the septums 132. The length 154 of the resonance chamber 152 therefore is longer than the vertical thickness 122 of the cellular core 106. This enables noise attenuation of relatively low frequency noise without increasing the vertical thickness 122 of the cellular core 106 and, thus, a vertical thickness of the acoustic panel 100. For example, each resonance chamber 152 may receive noise waves through the perforations 114 in the first skin 102. The resonance chamber 152 may reverse the phase of one or more frequencies of those sound waves using known acoustic reflection principles and subsequently direct the reverse phase sound waves out of the acoustic panel 100 through the perforations 114 to destructively interfere with other incoming noise waves.

The cellular core 106 may be constructed from any suitable material or materials. The cellular core 106, for example, may be constructed from a polymer, a fiber reinforced composite (e.g., fiberglass composite, carbon fiber composite, aramid fiber composite, composite reinforced by any combination of glass, carbon, aramid or other fibers), metal, alloys, metal matrix composite, ceramic, or ceramic matrix composite, or a combination thereof. One or more of components of the cellular core 106 may be constructed from the same or a like material. Alternatively, one or more of the components of the cellular core 106 may be constructed from a different material than one or more of the other components of the cellular core 106. Furthermore, the cellular core 106 may be constructed from the same material(s) as the first skin 102 and/or the second skin 104, or a different material or materials.

Referring to FIGS. 7 to 26C, one or more elements 156A-B (generally referred to as "156") of the acoustic panel 100 and, more particularly, the cellular core 106 may be configured with a multi-layered structure 158A-B (generally referred to as "158") with one or more structural reinforcements 160A-G (generally referred to as "160"). These structural reinforcements 160 are provided to increase rigidity, stability, strength and/or structural integrity of the corresponding element(s) 156 as well as the acoustic panel 100 as a whole. Examples of the one or more elements 156 include, but are not limited to: (A) one, some or each of the baffles 130; (B) one, some or each of the septums 132; (C) one, some or each of the arrays of corrugations 126; (D) one, some or each of the walls 124; and (E) a combination of any two or more of (A) to (D).

Figure 7:
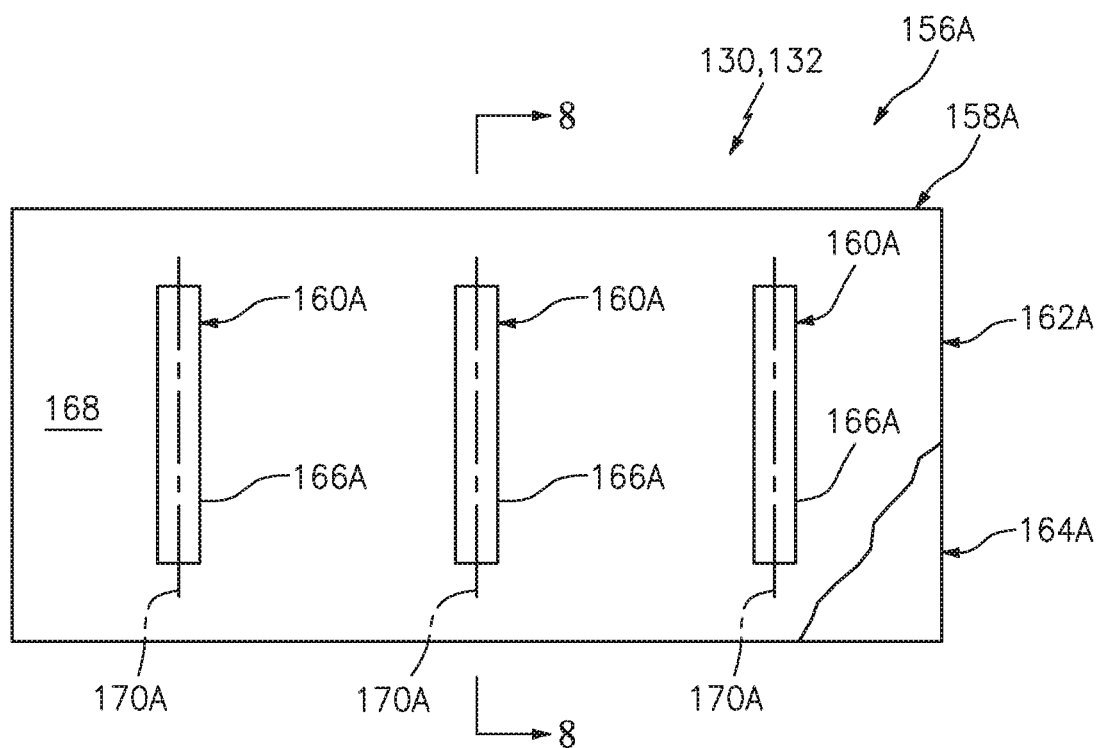
FIG. 7 is an illustration of a portion of a multi-layered structure configured with a plurality of structural reinforcements, in accordance with various embodiments.
Figure 8:
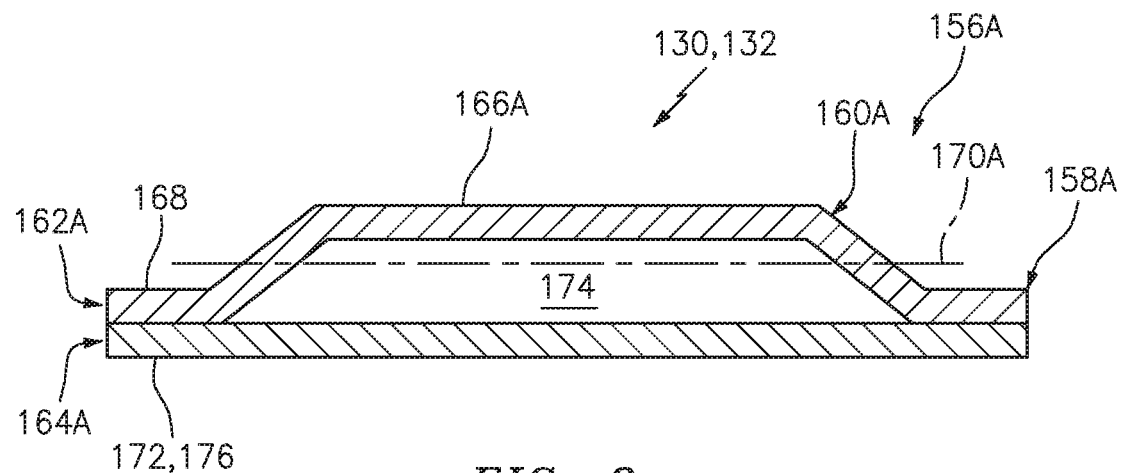
FIG. 8 is a side sectional illustration of the multi-layered structure portion of FIG. 7, in accordance with various embodiments.
Figure 9A:
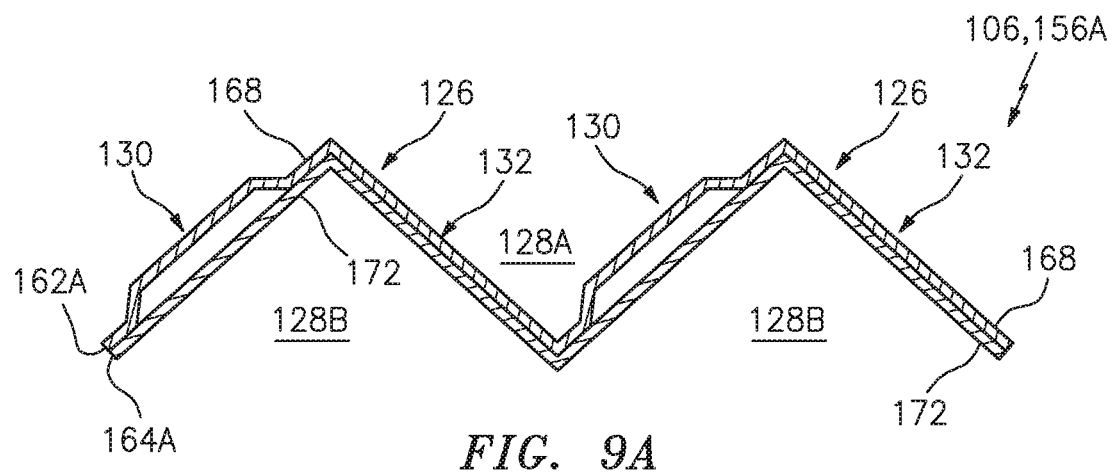
FIGS. 9A to 9C are side sectional illustrations of the multi-layered structure of FIG. 7 configured in various exemplary arrays of corrugations, in accordance with various embodiments.
Figure 10A:
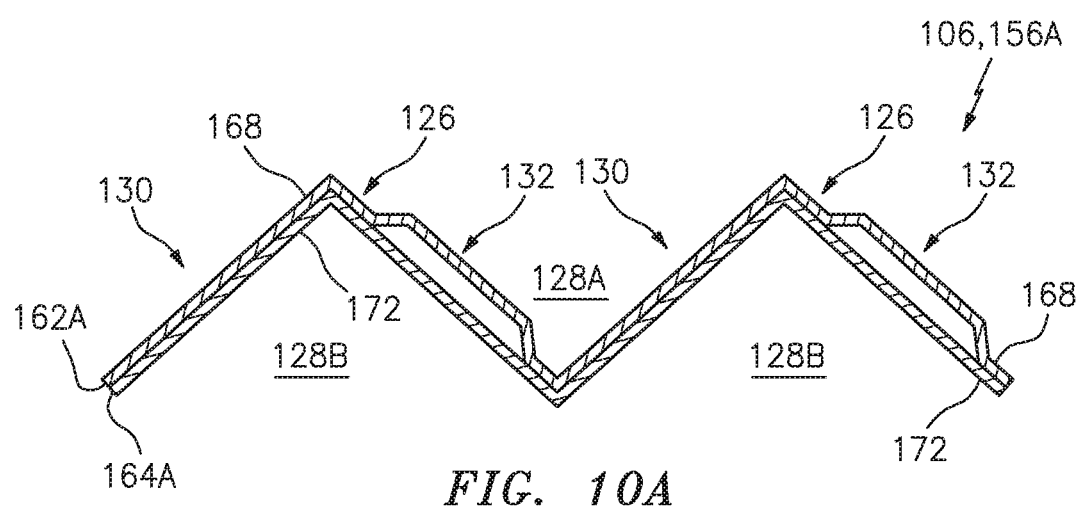
FIGS. 10A to 10C are side sectional illustrations of the multi-layered structure of FIG. 7 configured in other various exemplary arrays of corrugations, in accordance with various embodiments.
Figure 11A:
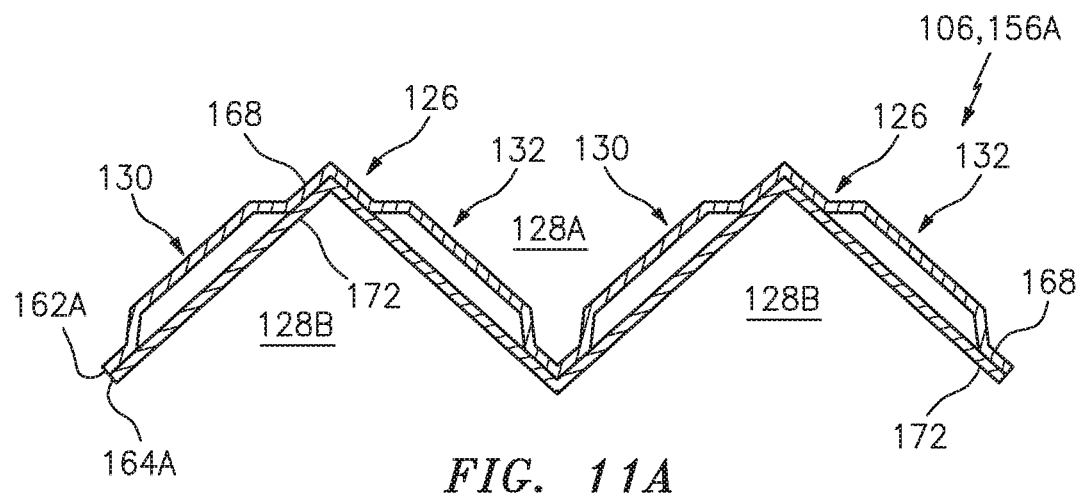
FIGS. 11A to 11C are side sectional illustrations of the multi-layered structure of FIG. 7 configured in still other various exemplary arrays of corrugations, in accordance with various embodiments.
Figure 9B:
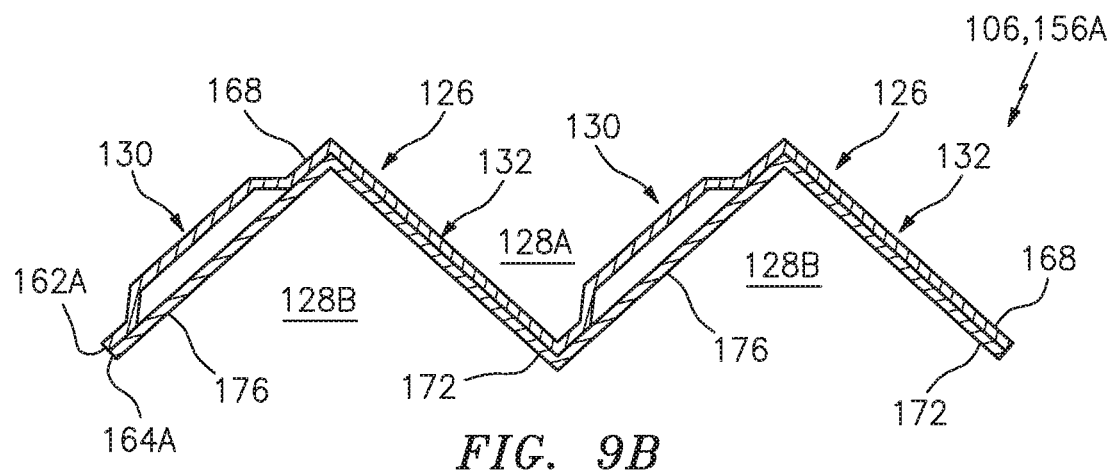
Figure 10B:
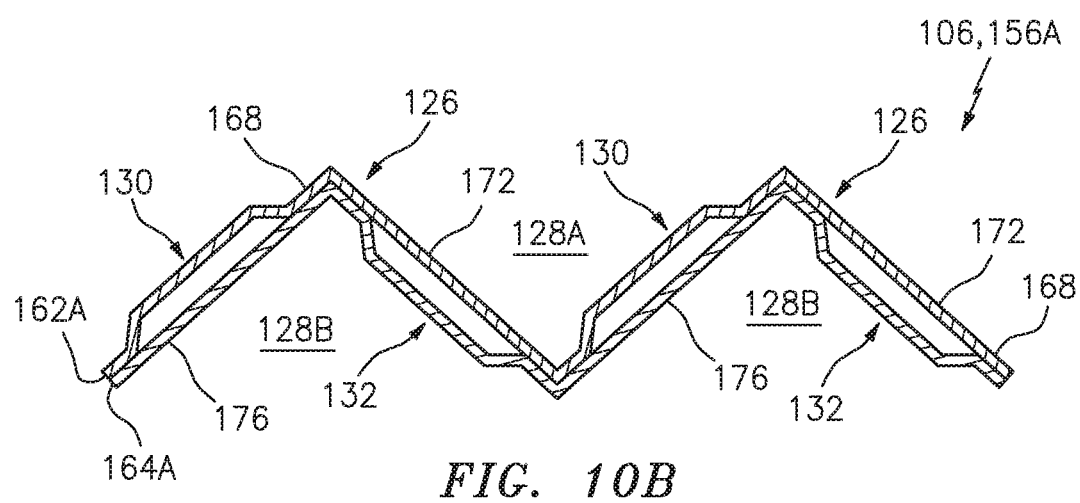
Figure 11B:
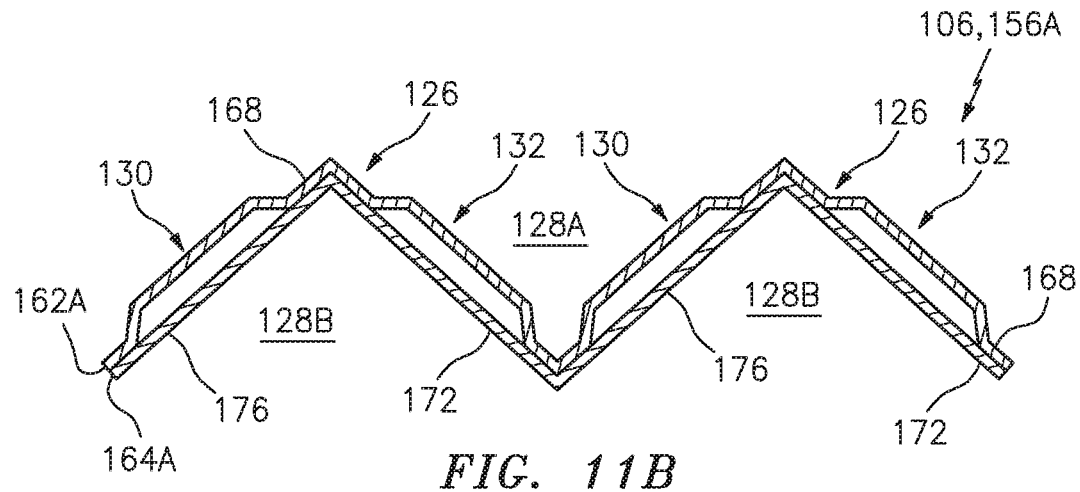
Figure 9C:
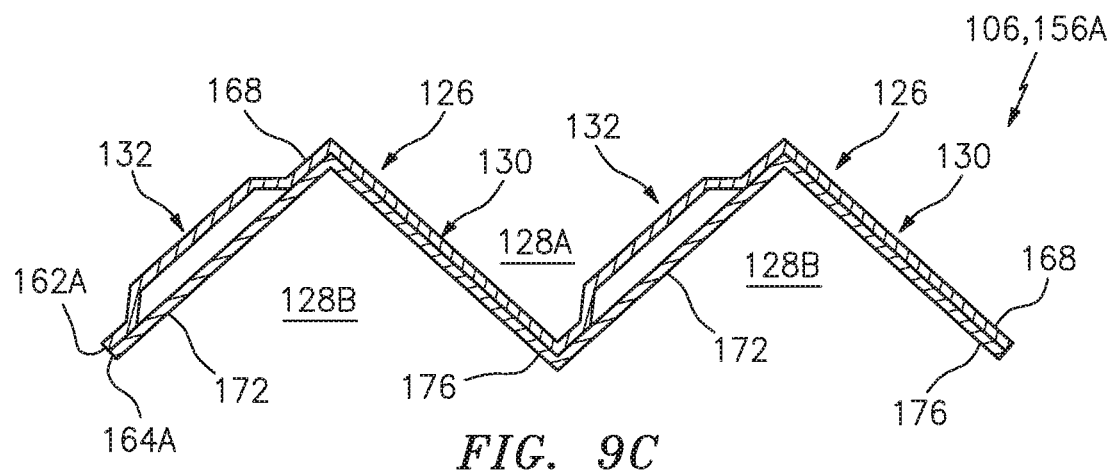
Figure 10C:
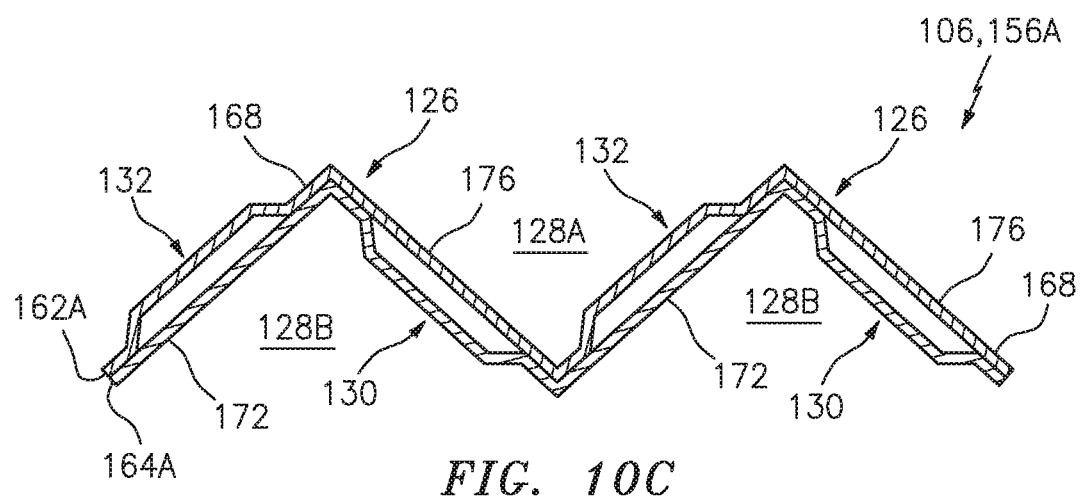
Figure 11C:
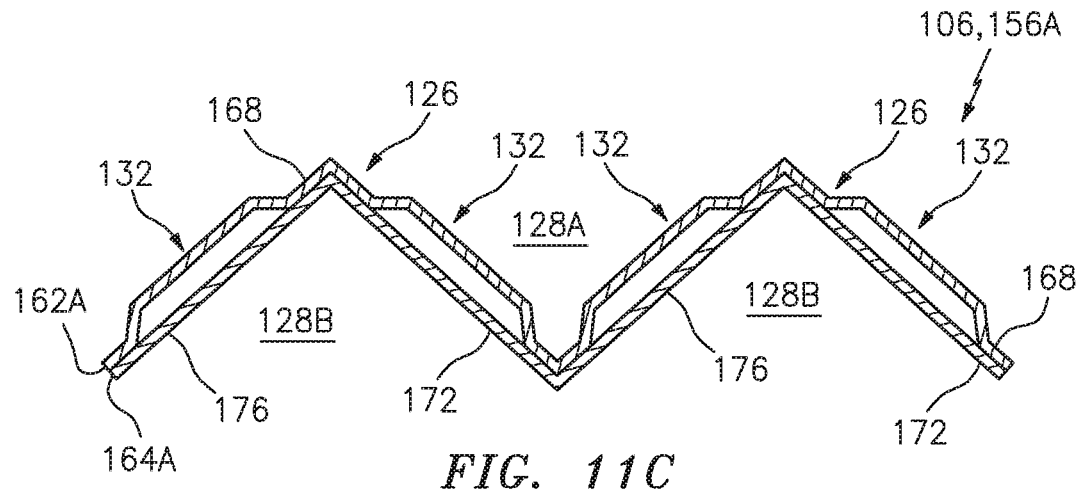
Figure 12:
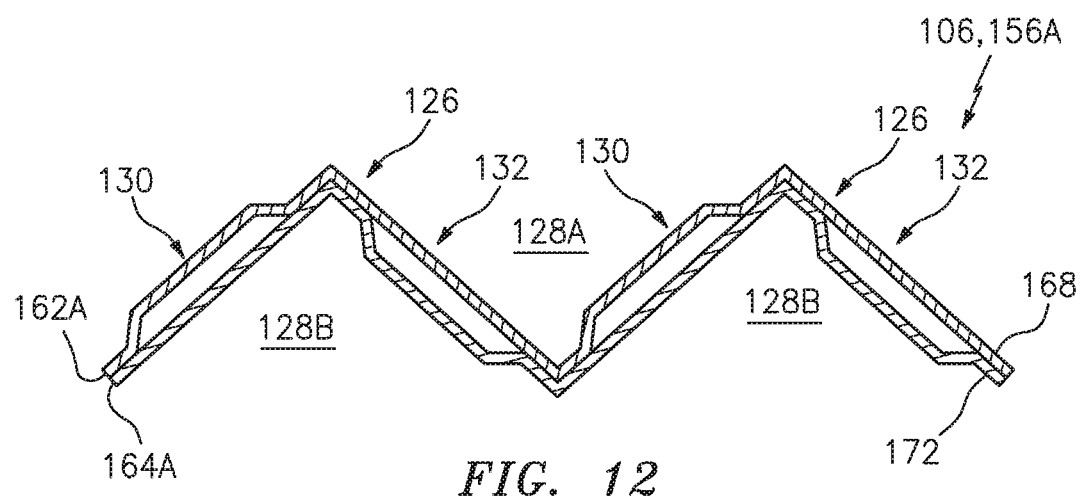
FIG. 12 is a side sectional illustration of the multi-layered structure of FIG. 7 configured in still another array of corrugations, in accordance with various embodiments.
Figure 13:
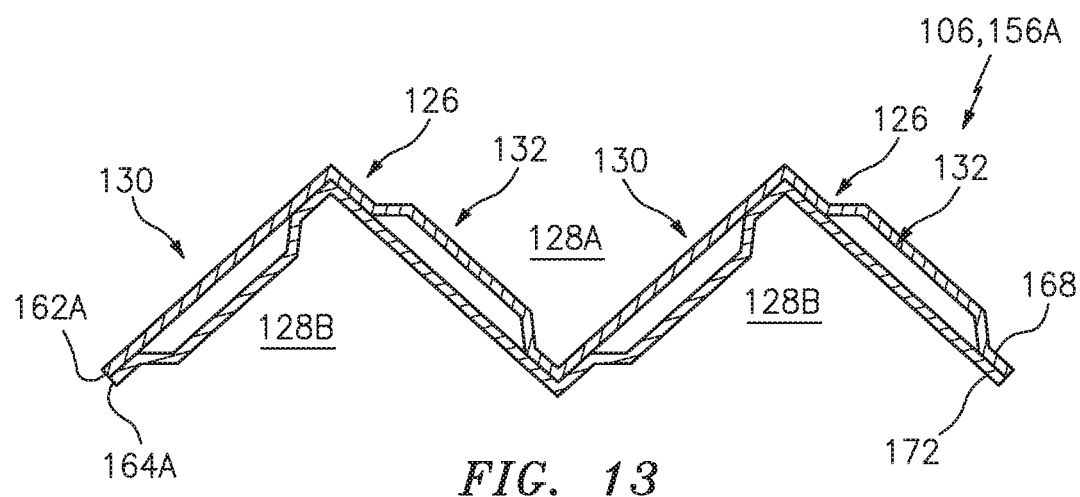
FIG. 13 is a side sectional illustration of the multi-layered structure of FIG. 7 configured in still another array of corrugations, in accordance with various embodiments.

FIGS. 7 and 8 illustrate a portion of the acoustic panel element 156A configured with the multi-layered structure 158A. This multi-layered structure 158A includes a first layer 162A (e.g., ply of material) and a second layer 164A (e.g., ply of material).

The first layer 162A may be a contoured layer. The first layer 162A of FIGS. 7 and 8, for example, is configured with one or more of the structural reinforcements 160A. Each structural reinforcement 160A of FIGS. 7 and 8 is configured as a rib 166A. Each rib 166A may be a stamped, molded and/or otherwise formed in the first layer 162A to project out from an exterior surface 168/side of the acoustic panel element 156A/multi-layered structure 158A. Each rib 166A extends along a trajectory 170A, where the trajectories 170A of the ribs 166A may be parallel with one another as shown in FIG. 7; however, in other embodiments, the trajectories 170A of some of the ribs 166A may be non-parallel. Note, the term "trajectory" may describe a centerline that follows along a length of a feature, where that length is greater than other dimensions (e.g., a width and/or a thickness) of the feature. Each trajectory 170A of FIG. 7 is straight-line trajectory. However, in other embodiments, the trajectory 170A of one or more of the ribs 166A may alternatively be a curved or otherwise convoluted line trajectory.

The second layer 164A may be a flat or non-contoured layer. The second layer 164A of FIGS. 7 and 8, for example, is configured without any structural reinforcements (e.g., ribs). More particularly, this second layer 164A is configured with a flat, planar and/or uninterrupted exterior surface 172, which exterior surface 172 is opposite the exterior surface 168. Of course, where the acoustic panel element 156A is configured as one of the arrays of corrugations 126, the exterior surface 172 may include a plurality of bends therein. However, each portion of the exterior surface 172 associated with a baffle 130 and/or a septum 132 may be flat, planar and/or uninterrupted as shown, for example, in FIGS. 9A to 11A, FIGS. 9B to 11B, FIGS. 9C to 11C, and FIGS. 12 and 13-.

Referring again to FIGS. 7 and 8, the second layer 164A is bonded and/or otherwise attached to the first layer 162A. This attachment may be a direct attachment as shown in FIG. 8. Alternatively, the attachment may be an indirect attachment with, for example, one or more intermediate layers between the first layer 162A and the second layer 164A.

Figure 14:
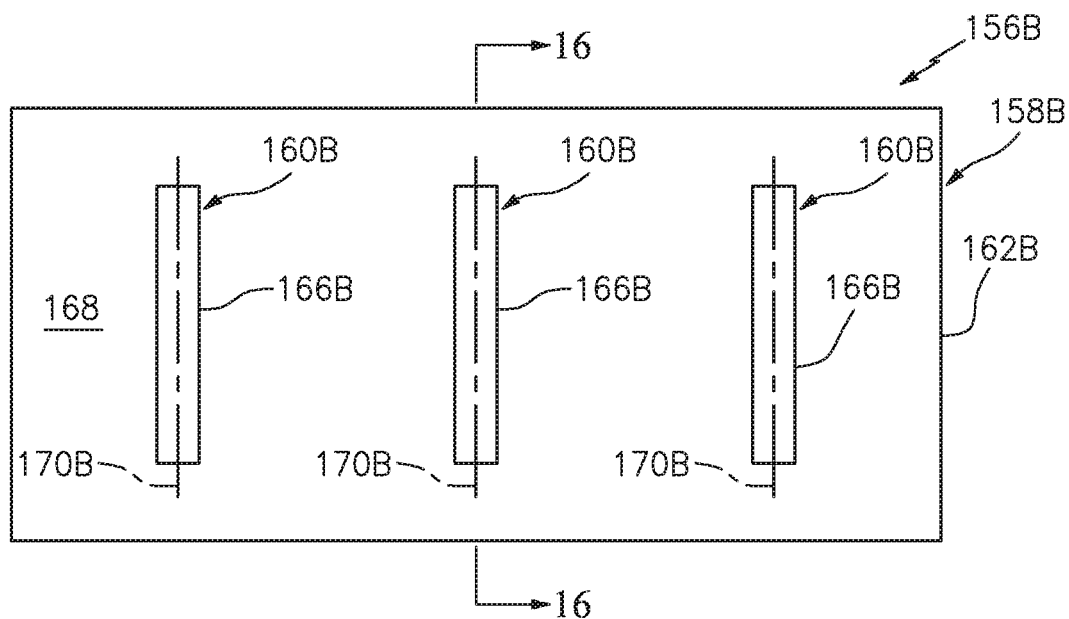
FIG. 14 is an illustration of a first side of a portion of a multi-layered structure configured with a plurality of structural reinforcements, in accordance with various embodiments.
Figure 15:
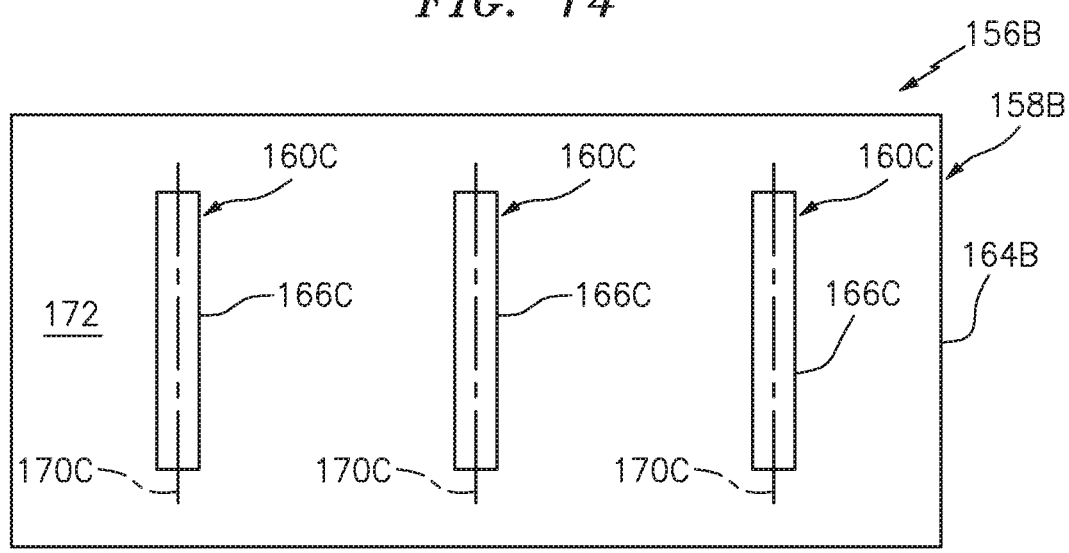
FIG. 15 is an illustration of a second side of the multi-layered structure portion of FIG. 14, in accordance with various embodiments.
Figure 16:
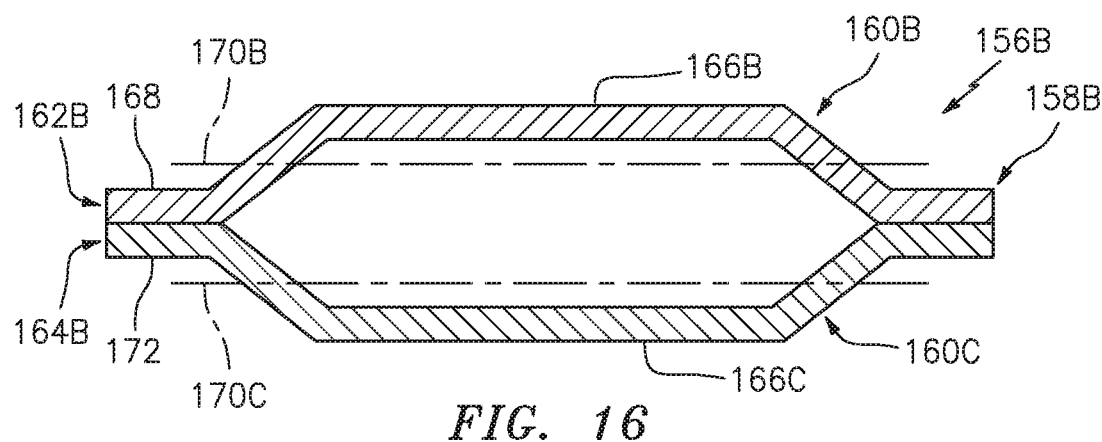
FIG. 16 is a side sectional illustration of the multi-layered structure portion of FIGS. 14 and 15, in accordance with various embodiments.
Figure 17:
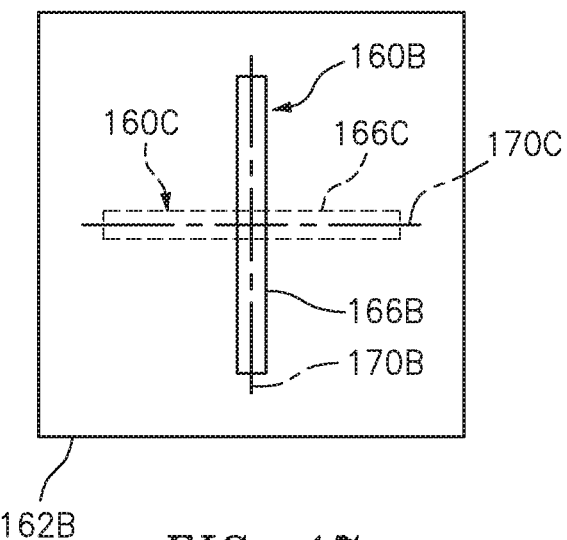
FIG. 17 is an illustration of a portion of a multi-layered structure configured with a plurality of structural reinforcements, in accordance with various embodiments.
Figure 18:
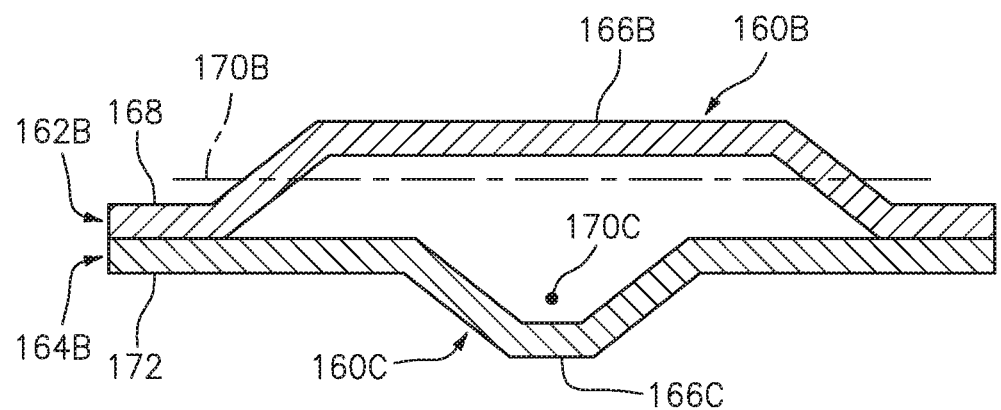
FIG. 18 is a side sectional illustration of the multi-layered structure portion of FIG. 17, in accordance with various embodiments.
Figure 19:
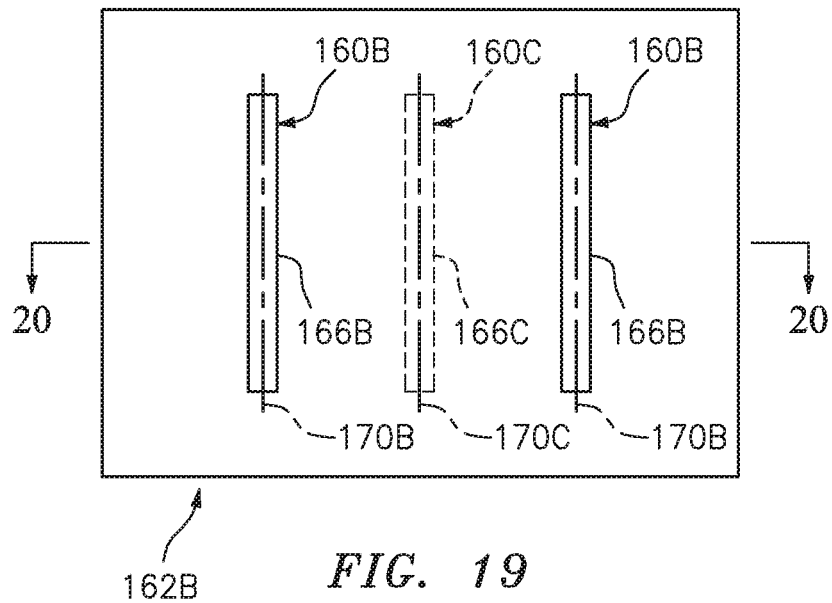
FIG. 19 is an illustration of a portion of a multi-layered structure configured with a plurality of structural reinforcements, in accordance with various embodiments.
Figure 20:
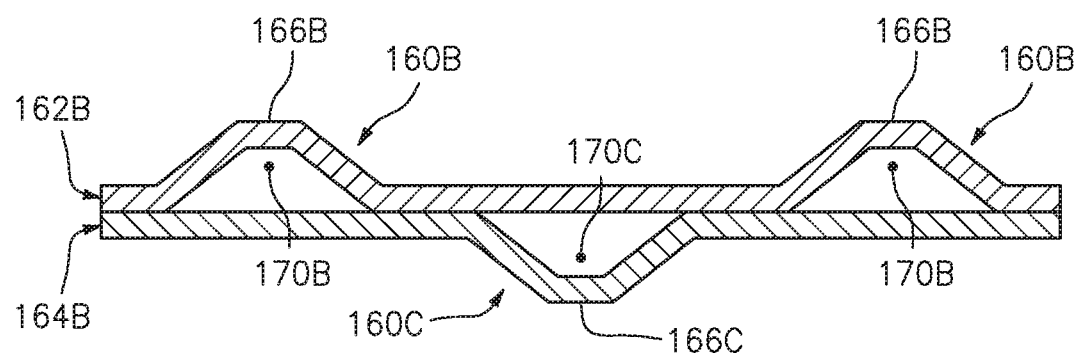
FIG. 20 is a side sectional illustration of the multi-layered structure portion of FIG. 17, in accordance with various embodiments.
Figure 21:
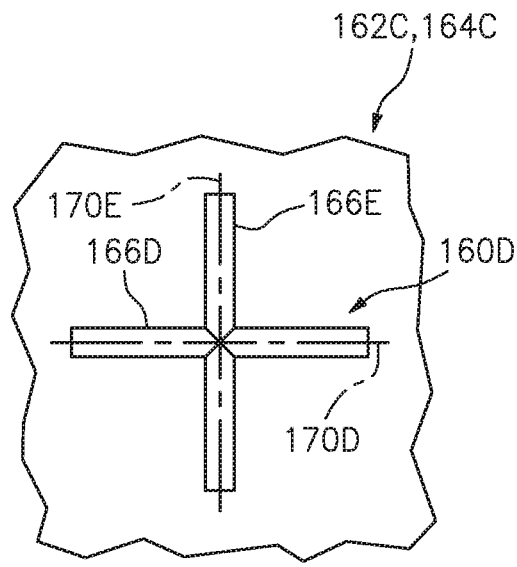
FIG. 21 is an illustration of a portion of a multi-layered structure configured with another structural reinforcement, in accordance with various embodiments.

FIGS. 14-16 illustrate a portion of the acoustic panel element 156B configured with the multi-layered structure 158B. This multi-layered structure 158B includes a first layer 162B (e.g., ply of material) and a second layer 164B (e.g., ply of material).

The first layer 162B may be a contoured layer. The first layer 162B of FIGS. 14 and 16, for example, is configured with one or more of the structural reinforcements 160B. Each structural reinforcement 160B of FIGS. 14 and 16 is configured as a rib 166B. Each rib 166B may be a stamped, molded and/or otherwise formed in the first layer 162B to project out from the exterior surface 168/side of the acoustic panel element 156B/multi-layered structure 158B. Each rib 166B extends along a trajectory 170B, where the trajectories 170B of the ribs 166B may be parallel with one another as shown in FIG. 14; however, in other embodiments, the trajectories 170B of some of the ribs 166B may be non-parallel.

The second layer 164B may also be a contoured layer. The second layer 164B of FIGS. 15 and 16, for example, is configured with one or more of the structural reinforcements 160C. Each structural reinforcement 160C of FIGS. 15 and 16 is configured as a rib 166C. Each rib 166C may be a stamped, molded and/or otherwise formed in the second layer 164B to project out from the exterior surface 172/side of the acoustic panel element 156B/multi-layered structure 158B. Each rib 166C extends along a trajectory 170C, where the trajectories 170C of the ribs 166C may be parallel with one another as shown in FIG. 15; however, in other embodiments, the trajectories 170C of some of the ribs 166C may be non-parallel. The trajectories 170C of the ribs 166C in the second layer 164B may also be parallel with the trajectories 170B of the ribs 166B in the first layer 162B; however, in other embodiments, the trajectories 170 and 170C of some of the ribs 166B and 166C may be non-parallel as shown, for example, in FIGS. 17 and 18. As shown in FIG. 16, each rib 166C in the second layer 164B may be (e.g., longitudinally, laterally and/or vertically) aligned with a closest one of the ribs 166B in the first layer 162B. The rib 166C thereby completely overlaps the rib 166B. However, in other embodiments, the rib 166C may partially overlap the rib 166B as shown, for example, in FIGS. 17 and 18. In still other embodiments, the rib 166C may not overlap any of the ribs 166B as shown, for example, in FIGS. 19 and 20.

Referring again to FIGS. 14-16, the first layer 162B is bonded and/or otherwise attached to the second layer 164B. This attachment may be a direct attachment as shown in FIG. 16. Alternatively, the attachment may be an indirect attachment with, for example, one or more intermediate layers between the first layer 162B and the second layer 164B.

Figure 22:
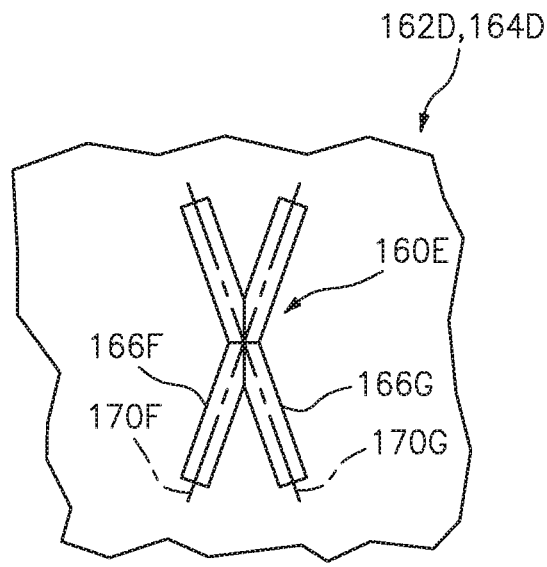
FIG. 22 is an illustration of a portion of a multi-layered structure configured with another structural reinforcement, in accordance with various embodiments.
Figure 23:
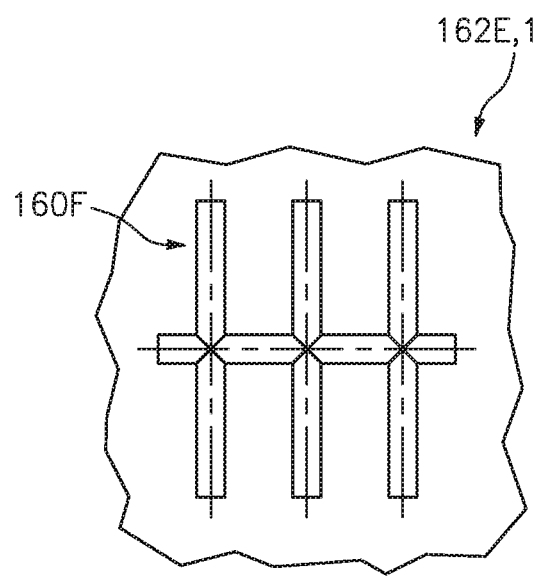
FIG. 23 is an illustration of a portion of a multi-layered structure configured with another structural reinforcement, in accordance with various embodiments.
Figure 24:
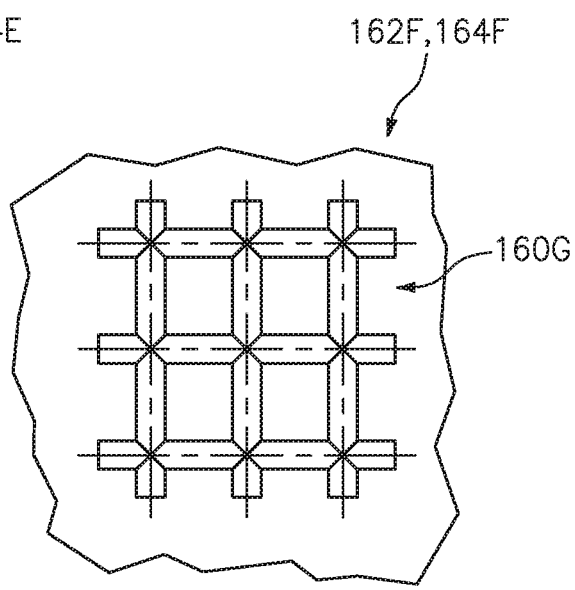
FIG. 24 is an illustration of a portion of a multi-layered structure configured with still another structural reinforcement, in accordance with various embodiments.
Figure 25:
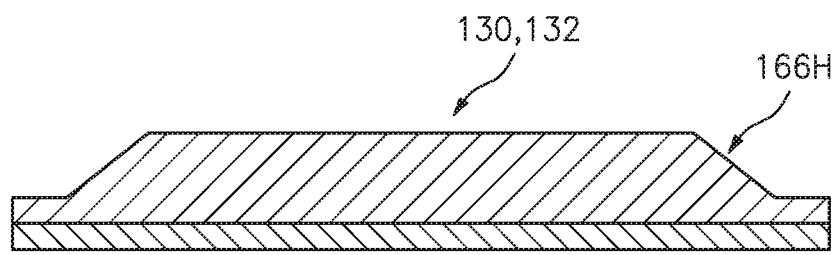
FIG. 25 is an illustration of a portion of a multi-layered structure configured with a solid rib, in accordance with various embodiments.
Figure 26A:
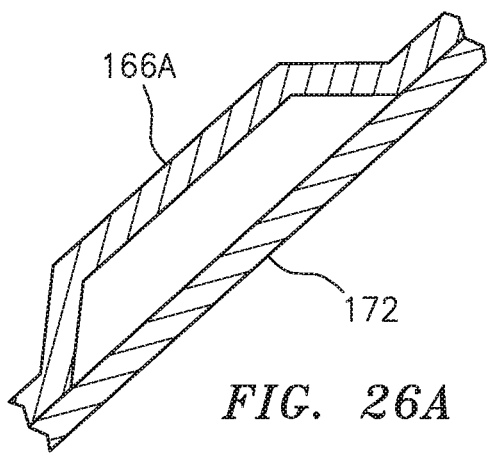
FIGS. 26A to 26C are illustrations of other various exemplary portions of a multi-layered structure configured with a perforated or non-perforated rib and/or a perforated or non-perforated exterior surface, in accordance with various embodiments.
Figure 26B:
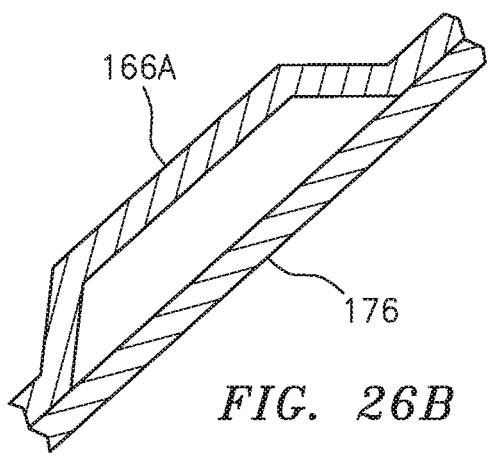
Figure 26C:
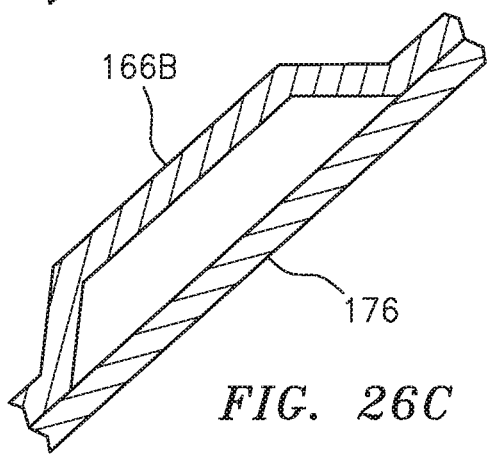

Each structural reinforcement 160 describe above includes a single discrete rib 166A-C (generally referred to as "166"). However, in other embodiments, one or more of the structural reinforcements 160 in the first layer 162C-F and/or in the second layer 164C-F may each include a plurality of ribs as shown, for example, in FIGS. 21-24. The structural reinforcement 160D of FIG. 21, for example, includes a first rib 166D and a second rib 166E. The first rib 166D extends along a first trajectory 170D and the second rib 166E extends along a second trajectory 170E. The first trajectory 170D and the second trajectory 170E are straight-line trajectories; however, in other embodiments, one or both of these trajectories 170D and 170E may alternatively be curved or otherwise convoluted line trajectories. The first trajectory 170D of the first rib 166D is non-parallel with the second trajectory 170E of the second rib 166E. The first trajectory 170D and the first rib 166D of FIG. 21, for example, are perpendicular and coincident with the second trajectory 170E and the second rib 166E. Of course, in other embodiments, an included angle between the first and the second trajectories 170F and 170G and ribs 166F and 166G of the structural reinforcement 160E may be acute (or obtuse) as shown in FIG. 22 for example. Referring again to FIG. 21, the first rib 166D intersects and thereby runs into the second rib 166E. The first rib 166D of FIG. 21, for example, bisects the second rib 166E and the second rib 166D bisects the first rib 166E.

Each of the ribs 166A-G (generally referred to as "166") shown in FIGS. 8, 9A-11A, 9B-11B, 12, 13, 14, 16 and 18 is configured as a hollow rib. The rib 166A of FIG. 8, for example, defines an empty channel 174 in an interior side of the first layer 162A such than this channel 174 separates the rib material of the first layer 162A from the adjacent material of the second layer 164A. However, in other embodiments, one or more of the ribs 166 described herein may be configured as a solid rib 166H as shown, for example, in FIG. 25. In yet further embodiments, one or more of the ribs 166 described herein may be configured as a perforated rib 166A or non-perforated rib 166B with a solid opposite surface 172 or a perforated opposite surface 176 as shown, for example, in FIGS. 26A, 26B and 26C. In still other embodiments, the channel 174 of FIG. 8 may be alternatively filled with another material to provide a solid rib, which may be perforated or non-perforated.

In some embodiments, each layer 162, 164 of the multi-layered structure 156 may be configured from composite material. Each layer 162, 164, for example, may be formed from one or more plies of fiber reinforcement within a polymer matrix. The one or more plies of fiber reinforcement within the first layer 162 may be discrete (e.g., not touching and/or formed part of) the one or more plies of fiber reinforcement within the second layer 164. For example, each layer 162, 164 may be laid up in a separate step. However, the present disclosure is not limited to the foregoing exemplary materials and/or layup.

In some embodiments, the first layer 162 and the second layer 164 may each partially define one or more of the cavities 128. For example, referring to FIGS. 9-11, the first layer 162 may partially define one or more of the sub-cavities 128A. In these embodiments, the first layer ribs 166 project partially into the cavities 128 and, more particularly, the sub-cavities 128A. The second layer 164, by contrast, may partially define one or more of the opposing sub-cavities 128B. However, in other embodiments, the first and the second layers 162 and 164 may be reversed such that the first layer 162 may partially define one or more of the sub-cavities 128B and the second layer 164 may partially define one or more of the opposing sub-cavities 128A. Accordingly, the first layer ribs 166 will project partially into one or more of the sub-cavities 128B.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A structured panel, comprising:
a first skin with a plurality of perforations;
a second skin; and
a core forming a plurality of cavities vertically between the first skin and the second skin, each of the cavities respectively fluidly coupled with one or more of the perforations, and the cavities comprising a first cavity;
wherein an element of the core is configured with a multi-layered structure, the multi-layered structure includes a first layer and a second layer attached to the first layer, and the first layer is configured with a first rib projecting into the first cavity.

2. The structured panel of claim 1, wherein
the core includes an array of corrugations that include a first baffle, a second baffle and a first septum;
the first cavity is formed longitudinally between the first baffle and the second baffle; and
the first septum extends from the first skin and the first baffle to the second skin and the second baffle, and the first septum divides the first cavity into fluidly coupled sub-cavities.

3. The structured panel of claim 2, wherein the element comprises the first baffle.

4. The structured panel of claim 2, wherein the element comprises the first septum.

5. The structured panel of claim 2, wherein the element comprises the array of corrugations.

6. The structured panel of claim 2, wherein
the core further includes a first wall and a second wall;
the first cavity is formed laterally between the first wall and the second wall; and
the element comprises the first wall.

7. The structured panel of claim 1, wherein the second layer is configured with a second rib, and the first rib and the second rib are disposed on opposing sides of the multi-layered structure.

8. The structured panel of claim 7, wherein
the core includes an array of corrugations that include a first baffle, a second baffle and a first septum;
the first cavity is formed longitudinally between the first baffle and the second baffle;
the first septum extends from the first skin and the first baffle to the second skin and the second baffle, and the first septum divides the first cavity into fluidly coupled sub-cavities;
the first rib projects into a first of the fluidly coupled sub-cavities; and
the second rib projects into a second of the fluidly coupled sub-cavities.

9. The structured panel of claim 7, wherein
the cavities further comprises a second cavity adjacent the first cavity; and
the second rib projects into the second cavity.

10. The structured panel of claim 7, wherein
the first rib extends along a first trajectory; and
the second rib extends along a second trajectory that is non-parallel with the first trajectory.

11. The structured panel of claim 7, wherein
the first rib extends along a first trajectory; and
the second rib extends along a second trajectory that is parallel with the first trajectory.

12. The structured panel of claim 7, wherein the first rib at least partially overlaps the second rib.

13. The structured panel of claim 1, wherein the first rib is a solid first rib.

14. The structured panel of claim 1, wherein the first rib is a hollow first rib.

15. The structured panel of claim 1, wherein the first layer is further configured with a second rib projecting into the first cavity.

16. The panel of claim 1, wherein
the core comprises composite material; and
the first layer and the second layer each comprise a discrete ply of fiber reinforcement.

17. The structured panel of claim 1, wherein the panel is configured as a panel of a nacelle for an aircraft propulsion system.

18. A structured panel, comprising:
a first skin with a plurality of perforations;
a second skin; and
a core forming a plurality of cavities vertically between the first skin and the second skin, the core including an array of corrugations that include a first baffle, a second baffle and a first septum;
the cavities comprising a first cavity fluidly coupled with one or more of the perforations, the first cavity formed longitudinally between the first baffle and the second baffle; and
the first septum extending from the first baffle to the second baffle, and the first septum dividing the first cavity into fluidly coupled sub-cavities;
wherein the array of corrugations is configured with a multi-layered structure, the multi-layered structure comprises a first layer and a second layer bonded to the first layer, and the first layer is configured with a first structural reinforcement projecting into the first cavity.

19. The structured panel of claim 18, wherein the first structural reinforcement comprises a rib.

20. A method for manufacturing a structured panel for attenuating sound, the method comprising:
providing a first skin for the panel;
providing a second skin for the panel;
providing a core for the panel; and
bonding the core to the first skin and the second skin;
wherein the core forms a plurality of cavities between the first skin and the second skin, each of the cavities is respectively fluidly coupled with one or more perforations in the first skin, and the cavities include a first cavity;

wherein an element of the core is configured with a multi-layered structure, the multi-layered structure includes a first layer and a second layer attached to the first layer, and the first layer is configured with a first structural reinforcement projecting into the first cavity.

* * * * *